United States Patent Office
3,192,740
Patented July 6, 1965

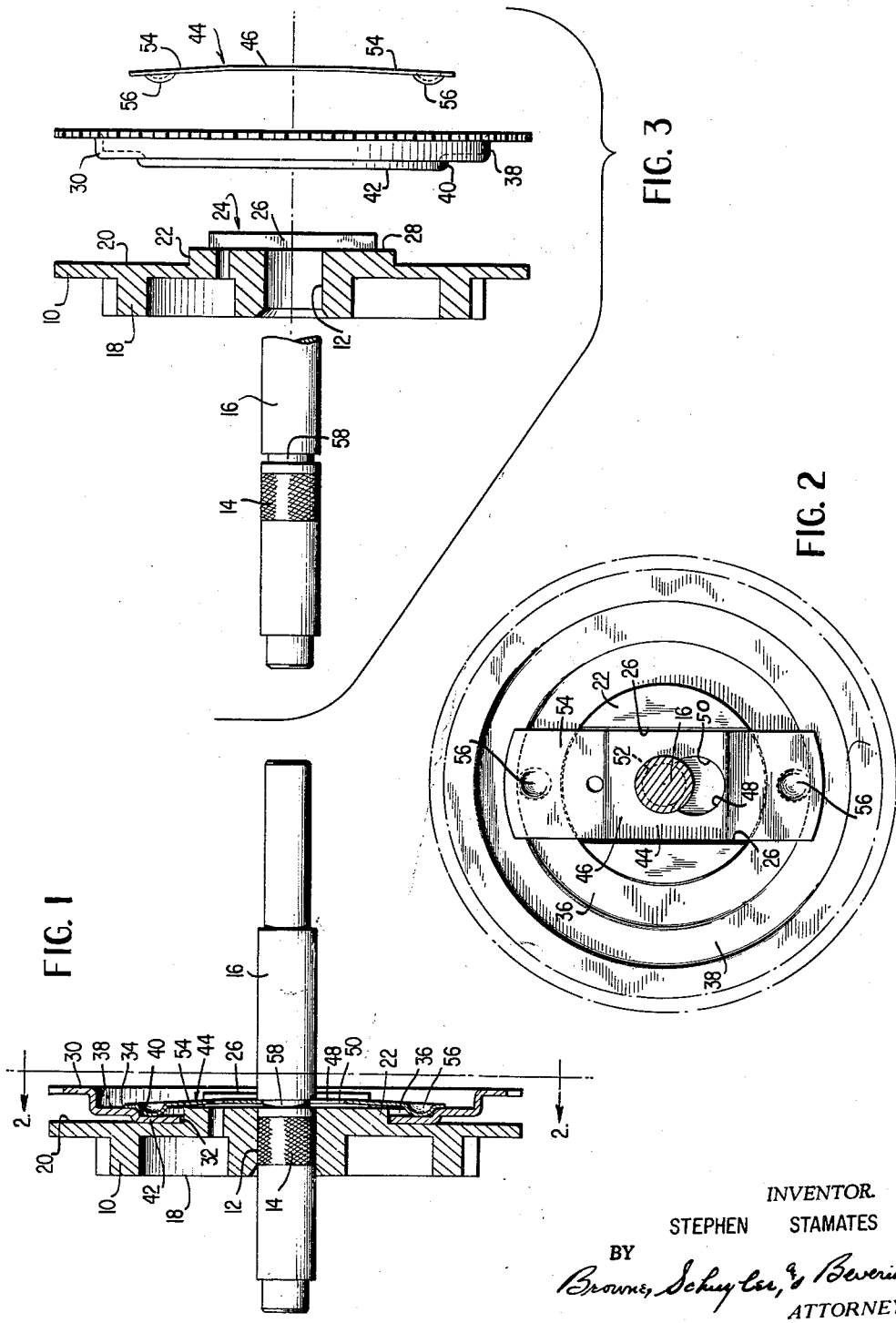

3,192,740
FRICTION CLUTCH
Stephen Stamates, Waterbury, Conn., assignor to Robertshaw Controls Company, Richmond, Va., a corporation of Delaware
Filed June 7, 1963, Ser. No. 286,383
9 Claims. (Cl. 64—30)

This invention relates to clutch mechanism for transmitting rotary motion from an input member to an output member, and particularly of the type in which the input and output members are frictionally coupled together until the torque between the input and output members exceeds a predetermined maximum whereupon the input member will slip relative to the output member to prevent overload, as well as to permit adjustment of the members relative to each other.

In conventional friction clutches or couplings, the several parts are generally secured together upon assembly by staking, welding, or other relatively permanent types of connection with the result that failure of any one of the parts requires that the entire assembly be discarded. Moreover, there is no convenient way to vary the magnitude of the frictional forces for different conditions since the assembled parts are permanently staked or welded together. As the parts wear with continued use, the frictional resistance of coupling varies and there is no convenient manner for compensating for the variation.

It is therefore, one of the objects of this invention to provide a friction coupling having a minimum number of parts which can be quickly and easily assembled and disassembled, and in which any one of the parts of the assembly can be replaced as desired.

A further object is to provide a friction clutch in which the friction forces between the clutch members can be changed as desired by merely replacing one of the parts.

Still another object is to provide a friction clutch which can be assembled and disassembled without the necessity of machining or grinding any of the parts.

A still further object of this invention is to provide a friction coupling in which the parts are firmly locked in assembled relationship during use but which can be quickly and easily disassembled manually, if desired.

In achievement of the foregoing, and other objects, a driving member having a clutch face is formed with a slotted boss projecting axially from the clutch face, and is fixed to a shaft so as to rotate with the shaft. Rotatably mounted on the boss is a driven member, which may be in the form of a gear or other motion transmission mechanism having a clutch face which is adapted to frictionally engage the clutch face of the driving member to thereby couple the members together.

Mounted on the shaft of the driving member and received in the slot of the circular boss is a clutch spring formed with a plurality of fingers which extend radially from the boss and engage the driven member to resiliently urge the clutch faces into frictional contact with each other. For interlocking the clutch spring with the shaft; a keyhole slot formed in the spring engages an annular groove provided in the shaft. In order to prevent the keyhole slot from accidentally slipping out of the annular groove, dimples or protuberances formed near the ends of the spring fingers cooperate with an annular shoulder in the driven member to restrain the spring against transverse movement relative to the shaft.

Engagement of the spring with the walls of the slot formed in the circular boss causes the spring to rotate with the driving member, and the frictional contact between the clutch faces causes the driven member to rotate with the driving member so long as the torque is insufficient to overcome the friction forces between the clutch faces. By holding the driven member stationary, the driving member can be rotated relative to the driven member to bring the members into proper adjustment or orientation.

Other objects and advantages of the invention will become apparent from the following description taken in connection with the accompanying drawings in which:

FIG. 1 is a sectional elevational view of a friction clutch or coupling embodying the present invention in its preferred form;

FIG. 2 is an end view, partially in section, taken on line 2—2 of FIG. 1; and

FIG. 3 is an exploded, elevational view, partially in section, of the clutch of FIGS. 1 and 2.

With reference to the drawings, driving member 10 which is preferably circular or disk-shaped is formed with a central opening 12, which is pressed onto the knurled portion 14 of a shaft or arbor 16. For use in a timer mechanism or the like, driving member 10 may be in the form of a cam member of phenolic plastic having cam tracks integrally molded on one side 18 thereof. Driving member 10 is formed with a clutch face or surface 20 opposite side 18, from which projects a circular boss 22 formed concentrically with opening 12. Formed diametrically in boss 22 is a slot 24 having parallel side walls 26 and a base 28.

In the assembly illustrated in the drawings, a driven member 30 is in the form of a preformed, steel gear member having an opening 32 for mounting the driven member 30 on boss 22 in such a manner that member 30 is freely rotatable relative to driving member 10. Driven member 30 is formed with stepped recesses 34 and 36 defining annular shoulders or walls 38 and 40 respectively. The outer surface of recess 36 which surrounds opening 32 defines a clutch face 42 which is adapted to frictionally engage clutch face 20 of driving member 10.

Members 10 and 30 are held in assembled relationship with their opposed clutch faces 20 and 42 respectively, resiliently held in frictional engagement by a clutch spring 44. Clutch spring 44 includes a rectangular central portion 46, of substantially the same width as that of slot 24. Formed in central portion 46 is a slot 48, preferably of keyhole configuration having a major diameter portion 50 and a minor diameter portion 52.

Extending from opposite ends of central portion 44 in a radial direction from the axis of shaft 16 are resilient fingers 54 in the ends of which are formed dimples or protuberances 56. Clutch spring 44 is bowed in such a manner that fingers 54 extend slightly inwardly, or toward the left as viewed in FIGS. 1 and 3 to press against driven member 30 on the opposite side from the clutch faces and urge clutch faces 42 and 20 into frictional engagement with each other.

Formed in shaft 16 adjacent the base 28 of slot 24 is an annular groove 58. To assemble the parts together, keyhole slot 48 may be slipped over the outer diameter of shaft 16 since the major diameter portion 50 is larger than the outside diameter of shaft 16 until central portion 46 of the spring is received in slot 24. When the keyhole slot registers with the annular groove 58, the spring is pushed downwardly until the minor diameter of the keyhole slot engages groove 58 to interlock the spring and shaft against relative axial movement. In this position, protuberances 56 are received in recess 36 and abut the annular shoulder 40 to thereby restrain the spring against transverse movement relative to shaft 16. Consequently, the parts are held in assembled relationship by the engagement of keyhole slot 48 with groove 58, and the abutting relationship of dimples or protuberances 56 with wall 40 further serves to prevent accidental disengagement of the slot from the groove.

Upon rotation of shaft 16, spring fingers 54 resiliently urge driven member 30 into frictional engagement with clutch face 20 of the driving member 10 to couple members 10 and 30 together. However, when the torque exceeds the frictional forces between the clutch faces, driven member 30 will slip or rotate relative to the driving member 10. When used in a timing mechanism or the like, the gear teeth of driven member 30 may mesh with the drive pinion of the timing mechanism, or a meter, which will prevent rotation of the driven member 30 when arbor or shaft 16 is manually rotated allowing adjustment of members 10 and 30. Walls 26 of slot 24 cooperate with central portion 44 of the clutch spring to prevent relative rotation between spring 44 and driving member 10.

The coefficient of friction between clutch surfaces 20 and 42 of members 10 and 30 respectively, and the force of spring 44 on the driven member 30 determine the effective friction of the assembly. To vary the friction forces between members 10 and 30, it is necessary only to push spring 44 transversely relative to shaft 16 by moving dimples 56 out of recess 36 and pushing upwardly as viewed in FIG. 1 on spring 44 to bring the major diameter portion 50 of the keyhole slot into concentric relationship with shaft 16, whereupon the spring can be removed and replaced by one having a different thickness or spring force.

While a specific embodiment of the invention has been illustrated for purposes of description, it should be understood that the invention is not confined to the exact construction shown and that various alternations or modifications in the construction and arrangement of parts is possible without departing from the scope and spirit of the invention.

What is claimed is:
1. A friction clutch comprising;
   a shaft,
   a driving member fixed to the shaft,
   a circular boss formed on the driving member concentric with the shaft,
   a driven member rotatably mounted on the boss adapted to frictionally engage the driving member,
   a slot formed diametrically in the circular boss,
   a bowed clutch spring including a central portion mounted on the shaft and received in the slot,
      said spring including at least one end portion extending from the central portion into engagement with the driven member to resiliently urge the driven member into frictional engagement with the driving member,
   and means detachably interlocking the central portion of the clutch spring with the shaft to prevent axial displacement of the clutch spring relative to the shaft and driving member.
2. A friction clutch as defined in claim 1 in which said interlocking means includes
   an annular groove formed in the shaft adjacent the base of the slot,
      and a keyhole slot formed in the central portion having a major diameter corresponding to the outer diameter of the shaft and a minor diameter corresponding to the diameter of said annular groove with the minor diameter portion being received in the annular groove.
3. A friction clutch comprising;
   a shaft,
   a driving member fixed to the shaft for rotation therewith,
   a driven member rotatably mounted on the driving member,
      said driving and driven members having opposed surfaces adapted for frictional engagement,
   an annular groove formed in the shaft,
   a clutch spring having a central portion with a keyhole slot formed therein,
      the major diameter of said keyhole slot being greater than the diameter of the shaft and the minor diameter of the keyhole slot being less than the diameter of the shaft and greater than the diameter of the annular groove,
      said minor diameter portion being received in the annular groove to prevent relative axial movement between the shaft and clutch spring,
   and fingers formed on the clutch spring extending from the central portion into engagement with the driven member to resiliently urge said opposed surfaces into frictional engagement.
4. In a friction clutch including a driving member and a driven member having opposed clutch faces with the driving member fixed to a shaft and the driven member mounted for rotation relative to the driving member and the shaft,
   an annular groove formed in the shaft,
   a clutch spring having a keyhole slot formed therein with a major diameter greater than the shaft diameter and a minor diameter less than the shaft diameter and greater than the diameter of the annular groove with the minor diameter portion received in the annular groove to interlock the shaft and clutch spring against relative axial movement,
      said clutch spring engaging the driven member to resiliently urge it into frictional engagement with the driving member,
   and abutment means on the driving member engaging the clutch spring to prevent relative rotation between the clutch spring and driving member.
5. A friction clutch comprising;
   a driving member having a clutch face,
   a driven member disposed in opposed axial relationship with the driving member and mounted for rotation relative to the driving member,
      said driven member having a clutch face disposed in opposed relationship with the clutch face of of the driving member and adapted to frictionally engage the clutch face of the driving member to frictionally couple the driving and driven members together,
   a cylindrical member projecting coaxially from the clutch face of the driving member,
   an annular groove formed in the cylindrical member,
   a clutch spring having a central portion formed with a keyhole slot,
      the major diameter portion of the keyhole slot being greater than the diameter of the cylindrical member, and the minor diameter portion of the keyhole slot being less than the diameter of the cylindrical member and received in the annular groove to prevent axial displacement of the spring relative to the driving member,
   at least one finger formed on the clutch spring engaging the side of the driven member opposite its clutch face to resiliently urge the clutch faces into frictional engagement,
   and abutment means on the driving member engaged with the clutch spring to prevent relative rotation between the driving member and clutch spring.
6. A friction clutch as defined in claim 5 further including
   a protuberance on the end of the finger projecting toward the driven member,
   and a circular shoulder on the driven member engageable with said protuberance to prevent transverse movement of the clutch spring relative to the cylindrical member.
7. A friction clutch comprising;
   a pair of clutch members co-axially mounted for rotation relative to each other,
      said clutch members having opposed clutch faces frictionally interengageable to couple the clutch members together for rotation as a unit,
   a clutch spring, and means mounting said clutch spring on one of said clutch members for rotation therewith and preventing relative axial displacement therebetween including a slot in said spring and a groove in one of said clutch members receiving portions of said spring surrounding said slot,
    said clutch spring engaging the other of said members to resiliently bias said clutch faces into frictional contact with each other.

8. A friction clutch comprising;
a pair of clutch members co-axially mounted for rotation relative to each other and having opposed clutch faces frictionally inter-engageable to couple the clutch members together for rotation as a unit,
resilient means, and
means detachably mounting said resilient means on one of said clutch members for rotation therewith and preventing relative axial displacement therebetween including a slot in said resilient means and a groove in said one clutch member receiving portions of said resilient means surrounding said slot,
    said resilient means engaging said other clutch member to resiliently urge the clutch faces into frictional inter-engagement.

9. A friction clutch comprising;
a pair of clutch members co-axially mounted for rotation relative to each other and having opposed clutch faces adapted to be frictionally engaged with each other to couple the clutch members together for rotation as a unit,
resilient means mounted on one of said clutch members for rotation with said one clutch member,
and a detachable slot and groove connection between said one clutch member and said resilient means preventing axial displacement between said one clutch member and said resilient means,
    said resilient means engaging said other clutch member to resiliently urge the opposed clutch faces into frictional engagement,
    said other clutch member having a recess for receiving said resilient means to maintain said resilient means in co-axial orientation with respect to said clutch members.

References Cited by the Examiner
UNITED STATES PATENTS

| | | | |
|---|---|---|---|
| 1,228,627 | 6/17 | Winans | 24—211 |
| 1,266,280 | 5/18 | Kocourek | 64—30 |
| 1,575,637 | 3/26 | Neth | 64—30 |
| 2,050,542 | 8/36 | Pace | 64—30 |
| 2,564,103 | 8/51 | Gallagher | 64—30 |
| 2,651,530 | 9/53 | Blydenburgh | 64—30 |
| 3,111,824 | 11/63 | Firth | 64—30 |

FOREIGN PATENTS 559,932   3/44   Great Britain.

ROBERT C. RIORDON, *Primary Examiner.*